(12) United States Patent
Mochizuki

(10) Patent No.: US 8,928,922 B2
(45) Date of Patent: Jan. 6, 2015

(54) PRINTING SYSTEM

(71) Applicant: Fuji Xerox Co., Ltd., Minato-ku, Tokyo (JP)

(72) Inventor: Mamoru Mochizuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/947,688

(22) Filed: Jul. 22, 2013

(65) Prior Publication Data

US 2014/0268201 A1 Sep. 18, 2014

(30) Foreign Application Priority Data

Mar. 14, 2013 (JP) .................................. 2013-052109

(51) Int. Cl.
*G06F 3/12* (2006.01)

(52) U.S. Cl.
CPC .................................... *G06F 3/1298* (2013.01)
USPC .......................... 358/1.15; 358/1.13; 358/1.17

(58) Field of Classification Search
CPC ........ G06F 3/124; G06F 3/1247; G06F 3/126
USPC ....................................... 358/1.13, 1.15, 1.17
See application file for complete search history.

(56) References Cited

U.S. PATENT DOCUMENTS

| | | | |
|---|---|---|---|
| 5,859,711 A * | 1/1999 | Barry et al. ................... | 358/296 |
| 6,380,951 B1 * | 4/2002 | Petchenkine et al. .......... | 715/736 |
| 6,657,741 B1 * | 12/2003 | Barry et al. ................... | 358/1.15 |
| 6,941,865 B2 * | 9/2005 | Kato ............................ | 101/484 |
| 7,206,082 B2 * | 4/2007 | Barry et al. ................... | 358/1.13 |
| 7,233,409 B2 * | 6/2007 | Barry et al. ................... | 358/1.15 |
| 7,233,993 B2 * | 6/2007 | Sakai ............................ | 709/226 |
| 7,265,860 B2 * | 9/2007 | Ferlitsch ....................... | 358/1.15 |
| 7,339,687 B2 * | 3/2008 | Ferlitsch ....................... | 358/1.13 |
| 8,154,766 B2 * | 4/2012 | Torii ............................. | 358/2.1 |
| 2004/0120003 A1 * | 6/2004 | Barry et al. ................... | 358/1.15 |
| 2009/0080025 A1 * | 3/2009 | Aronshtam et al. ........... | 358/1.17 |
| 2011/0075165 A1 | 3/2011 | Hayakawa | |

FOREIGN PATENT DOCUMENTS

| | | |
|---|---|---|
| JP | 9-218763 A | 8/1997 |
| JP | 10-289066 A | 10/1998 |
| JP | 2007-58511 A | 3/2007 |
| JP | 2011-70337 A | 4/2011 |

* cited by examiner

*Primary Examiner* — Dennis Dicker
(74) *Attorney, Agent, or Firm* — Sughrue Mion, PLLC

(57) ABSTRACT

A printing system includes an allotment device, spooling devices, interpretation devices, and a print controller. The allotment device allots pages of print data to the interpretation devices in a distributed manner in a predetermined order without regard to a print output order corresponding to an imposition designation. The interpretation devices interpret the allotted pages to generate interpretation result data, and each cause a spooling device corresponding to that interpretation device to store the generated interpretation result data. The print controller acquires reference information indicating which spooling device stores the interpretation result data corresponding to each page and output order information indicating the print output order, acquires the interpretation result data for each page from the spooling device storing the interpretation result data for that page in the print output order, and imposes page image data based on the acquired interpretation result data in accordance with the imposition designation.

3 Claims, 4 Drawing Sheets

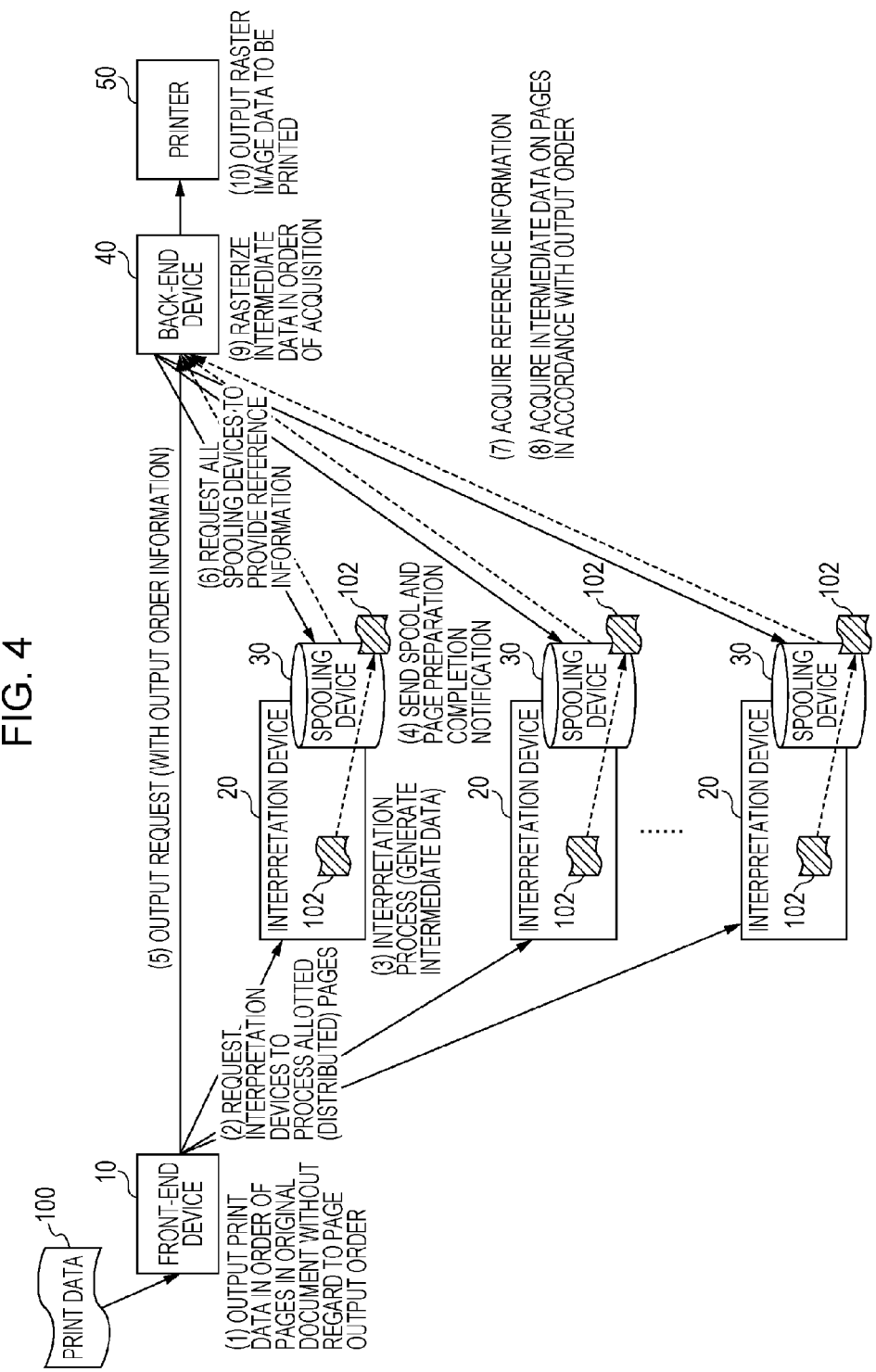

PRINTING SYSTEM

CROSS-REFERENCE TO RELATED APPLICATIONS

This application is based on and claims priority under 35 USC 119 from Japanese Patent Application No. 2013-052109 filed Mar. 14, 2013.

BACKGROUND

Technical Field

The present invention relates to a printing system.

SUMMARY

According to an aspect of the present invention, there is provided a printing system including: a plurality of interpretation devices; a plurality of spooling devices; an allotment device that allots pages of print data written in a page description language to the plurality of interpretation devices in a distributed manner in a predetermined order without regard to a print output order of the pages corresponding to an imposition designation, the plurality of interpretation devices interpreting the pages of the print data allotted by the allotment device to generate interpretation result data, and each causing a spooling device of the plurality of spooling devices corresponding to that interpretation device to store the generated interpretation result data; and a print controller that acquires reference information indicating which of the plurality of spooling devices stores the interpretation result data corresponding to each of the pages of the print data and output order information indicating the print output order of the pages corresponding to the imposition designation, that acquires the interpretation result data for each page from the spooling device storing the interpretation result data for that page designated by the reference information in the print output order indicated by the output order information, and that imposes page image data based on the acquired interpretation result data for the pages in accordance with the imposition designation to supply the resulting data to a printer to be printed.

BRIEF DESCRIPTION OF THE DRAWINGS

An exemplary embodiment of the present invention will be described in detail based on the following figures, wherein:

FIG. 4 illustrates the flow of a process performed in the case where generation and spooling of intermediate data and issuance of an output request are performed separately in the system according to the exemplary embodiment.

DETAILED DESCRIPTION

An exemplary embodiment of the present invention will be described below with reference to the drawings.

Figure 1:
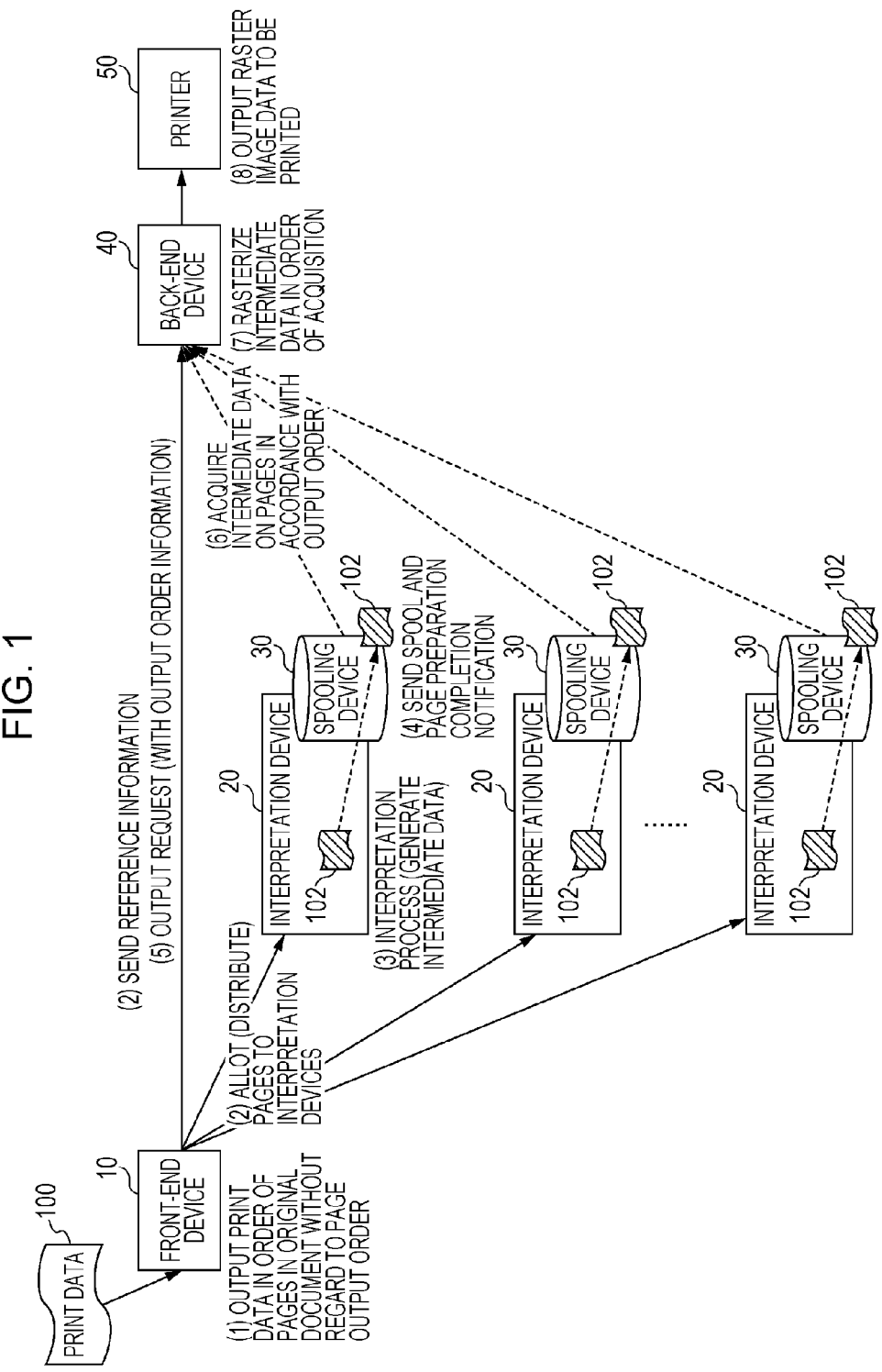
FIG. 1 illustrates the overview of a system according to an exemplary embodiment.

As shown in FIG. 1, a printing system according to the exemplary embodiment includes a front-end device 10, plural interpretation devices 20, plural spooling devices 30, a back-end device 40, and a printer 50.

The front-end device 10 receives print data 100 written in a page description language (hereinafter abbreviated as "PDL") from a client device such as a personal computer or a work station. The front-end device 10 executes a distribution process in which the print data 100 are allotted page by page to the plural interpretation devices 20.

The interpretation device 20 interprets PDL data representing an image, and generates intermediate data 102 representing the image on the basis of the interpretation results. The intermediate data are intermediate between the PDL data and raster image data that may be handled by the printer 50. In general, the PDL data express an image as a collection of drawing commands for objects forming the image. On the contrary, the raster image data express an image as a collection of pixels having a predetermined number of sets of color values. The intermediate data are intermediate in particle size between the PDL data and the raster image data, and express an image as a collection of sub-objects obtained by further dividing the objects of the PDL data into plural pieces. Examples of the sub-objects include sectioned data obtained by sectioning an object of the PDL data (for example, a character, a graphic figure, or an image) at raster scanning lines. The sectioned data represent a section occupied by an object on a single scanning line, and may be represented by a set of coordinates at both ends of the section, for example, and may include information prescribing the pixel values of pixels in the section. The pixel values may be density values for basic colors used by printing engines for various colors such as C, M, Y, and K, for example. A display list is also well known as another example of the intermediate data. A process for interpreting PDL data to generate intermediate data will hereinafter be referred to as "RIP process".

The interpretation device 20 generates intermediate data 102 for a page allotted by the front-end device 10, and stores the generated intermediate data 102 in the spooling device 30.

The spooling device 30 is a device that spools the intermediate data 102 generated by the interpretation device 20.

In an example, one spooling device 30 is provided for one interpretation device 20. In another example, plural interpretation devices 20 forming one group may share one spooling device 30. In either case, one spooling device 30 basically corresponds to one interpretation device 20.

In an example, connection between the interpretation device 20 and the spooling device 30 is established by a communication unit that is faster than that for connection among the front-end device 10, the interpretation device 20, and the back-end device 40. For example, the front-end device 10, the interpretation device 20, and the back-end device 40 may be connected with each other via a local area network, and the interpretation device 20 and the spooling device 30 may be connected with each other via an internal bus of a computer.

The back-end device 40 is a device that is connected to the printer 50 and that controls the printer 50 so as to perform printing. The back-end device 40 collects intermediate data for pages of one print job stored in a distributed manner in the plural spooling devices 30, generates raster image data for the pages from the collected intermediate data for the pages, and transfers the generated raster image data to the printer 50 to print the transferred data on paper.

In the case of a business-purpose printing system for use to prepare books and pamphlets, plural pages are imposed on a large sheet of paper in an order determined in consideration of cutting and bookbinding processes. The order in which the pages are imposed (that is, the order in which the pages are output to be printed) may be different from the order of the pages in the print data as the original document.

Operation of the system according to the exemplary embodiment will be described below.

(1) As shown in FIG. 1, the front-end device 10 outputs print data 100 downstream in accordance with a predetermined order (for example, in the order of the pages in the print data 100) without considering the order in which the pages are to be output (imposed). In the case where the print data 100 are PDL (for example, PostScript (registered trademark)) data that are page-dependent (a type of data in which a command for a preceding page affects the drawing results of a following page), the entire print data 100 are provided to the interpretation devices 20. In the case where the print data 100 are page-independent PDL data, on the contrary, the print data 100 are divided page by page to be allotted to the interpretation devices 20.

(2) In this event, the front-end device 10 allots pages to be interpreted to the interpretation devices 20 in accordance with the predetermined order. In the exemplary embodiment, the pages are allotted in response to requests from the interpretation devices 20. That is, in the exemplary embodiment, each interpretation device 20 monitors its own processing load, and requests the front-end device 10 for a new page if it is determined from the viewpoint of processing load that predetermined performance criteria (for example, criteria that a newly allotted page will be completely processed within a predetermined time) may be met if a new page is allotted to the interpretation device 20, for example.

In the illustrated example, in the case where a page is allotted to the interpretation device 20, the front-end device 10 generates reference information, and sends the generated reference information to the back-end device 40.

Figure 2:
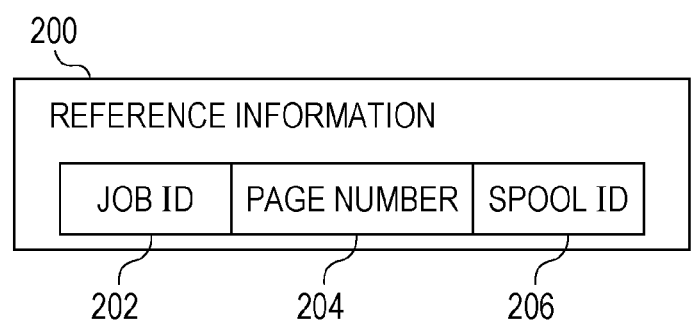
FIG. 2 shows an example of the data structure of reference information.

FIG. 2 shows an example of the data structure of reference information 200. As shown, the reference information 200 includes a job ID 202, a page number 204, and a spool ID 206.

The job ID 202 is identification information uniquely assigned to an input print instruction for the print data 100, that is, a printing process (or "job") performed in accordance with the print instruction. In the case where a print instruction including the print data 100 is input, the front-end device 10 assigns a new job ID to the input print instruction. After that, the system manages the job using the job ID.

The page number 204 is the number of the page assigned to the interpretation device 20, among the pages of the print data 100.

The spool ID 206 is identification information for uniquely identifying the spooling device 30 corresponding to the interpretation device 20 to which the page is allotted. In the case where the spooling device 30 is attached to the interpretation device 20 (for example, in the case where a storage device in a computer in which the interpretation device 20 is installed is used as the spooling device 30), identification information on the interpretation device 20 may be used as the spool ID 206.

In order to generate reference information 200, information on the correlation between the interpretation devices 20 and the spooling devices 30 has been registered in advance in the front-end device 10.

In an example, the front-end device 10 correlates the reference information 200 with a page allotment instruction, and also sends the correlated information to the interpretation device 200. In another example, a set of the job ID and the page number from the reference information 200 is correlated with a page allotment instruction, and sends the correlated information to the interpretation device 20.

In the case where there are plural back-end devices 40 available in the system, the front-end device 10 provides the interpretation device 20 with not only the reference information 200 but also identification information on the back-end device 40 designated as the current output destination. The interpretation device 20 sends a spool completion notification to the back-end device 40 indicated by the identification information.

(3) The interpretation device 20 interprets the received print data 100, and generates intermediate data 102 for the page allotted by the front-end device 10 in accordance with the interpretation results.

(4) The interpretation device 20 correlates the generated intermediate data 102 with the reference information 200 (in another example, a set of the job ID and the page number) received from the front-end device 10 and correlated with the page allotment instruction, and stores the correlated data in the spooling device 30 corresponding to the interpretation device 20.

When the intermediate data 102 on a page are stored, the spooling device 30 sends to the back-end device 40 a spool completion notification including the reference information 200 (in another example, a set of the job ID and the page number) corresponding to the intermediate data 102. The back-end device 40 recognizes for which page of which job intermediate data have been prepared, on the basis of the spool completion notification. Thus, in the case where the interpretation device 20 sends to the back-end device 40 a spool completion notification including the reference information 200 or the like, it is not necessary that the front-end device 10 should send the reference information to the back-end device 40.

The pages of the print data 100 are distributed to the interpretation devices 20 in the flow described above. Then, the plural interpretation devices 20 process different pages to concurrently interpret the print data 100.

(5) At any time point after the start of allotment of the pages to the interpretation devices 20, the front-end device 10 sends an output request for a job for the print data 100 to the back-end device 40. The output request includes a job ID and output order information. The output order information specifies the order in which the pages of the print data 100 are output to the printer 50 determined in consideration of how the pages are to be imposed on the paper to be printed ("folding" as called in the bookbinding field). The output order is determined on the basis of imposition designation information input from a client device and correlated with the print data 100.

The output order information sent to the back-end device 40 includes the numbers of the pages in the print data 100 arranged in accordance with the order in which the pages are output to the printer 50, for example. In another example, imposition designation information (and other information necessary to determine the output order of the pages) is sent to the back-end device 40, and the back-end device 40 determines the output order of the pages on the basis of the received information.

The timing when the front-end device 10 sends the output request to the back-end device 40 is not specifically limited. In an example, the output request is sent at the same time as allotment of the pages to the interpretation devices 20 is started. In another example, the output request is sent when allotment of the pages to the interpretation devices 20 has progressed to a certain degree (for example, when a predetermined time has elapsed since allotment of the pages is started, or when a predetermined number of pages (in some cases, all the pages of the print data 100) have been allotted).

(6) After receiving the output request, the back-end device 40 acquires the intermediate data 102 for the pages, sequentially from the intermediate data 102 for the first page in the output order indicated by the output order information, from the spooling devices 30 storing the intermediate data 102. The reference information 200 sent from the front-end device 10 or the spooling devices 30 is used to specify which spooling device 30 stores the intermediate data 102 for each page of the print data 100. For a page for which a spool completion notification has not arrived from the spooling device 30, the intermediate data for that page has not been spooled yet. Thus, the back-end device 40 does not attempt to acquire intermediate data for that page, and waits for arrival of a spool completion notification.

(7) The back-end device 40 rasterizes the intermediate data for the pages acquired in the output order, in the order of acquisition. The term "rasterize" refers to a process in which the intermediate data are converted into raster image data.

(8) The back-end device 40 imposes the raster image data for the pages obtained through the rasterization, and supplies the resulting data to the printer 50. The printer 50 prints the imposed raster image data for the group of pages onto paper.

The overview of the system according to the exemplary embodiment has been described above with reference to FIG. 1. Next, the front-end device 10, the interpretation device 20, and the back-end device 40 will be described in detail with reference to FIG. 3.

Figure 3:
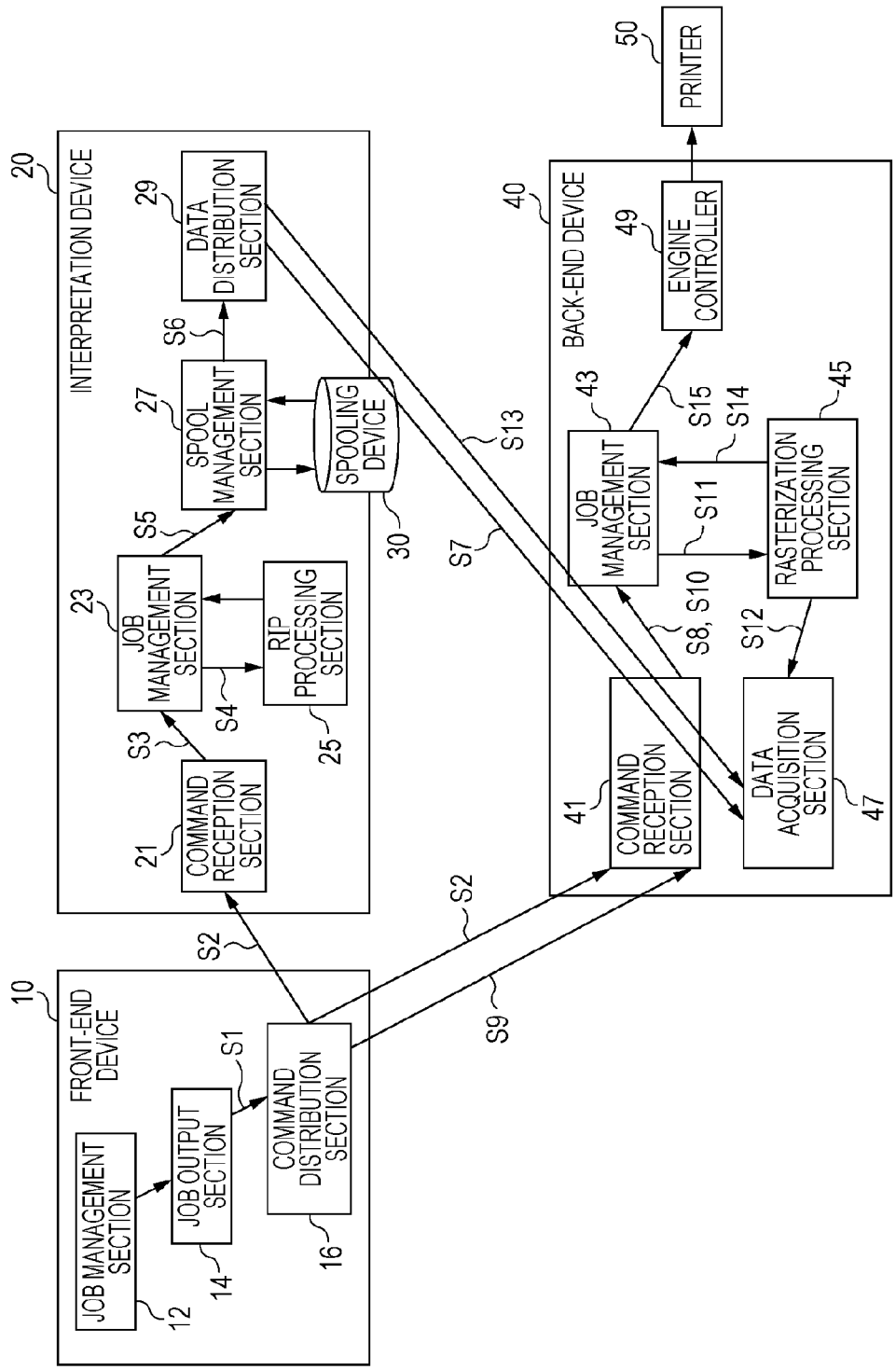
FIG. 3 shows an example of an internal functional configuration of various devices included in the system according to the exemplary embodiment.

As shown in FIG. 3, the front-end device 10 includes a job management section 12, a job output section 14, and a command distribution section 16.

When the job management section 12 receives print data 100 and a print instruction for the print data 100 from a client device, the job management section 12 generates a job ID corresponding to the print instruction, and executes so-called "job management" such as managing the order of execution of the print instruction. When the time for execution of the job arrives, the job management section 12 instructs the job output section 14 to output the job, and sends a process start instruction including the job ID to the interpretation devices 20 (only a representative one of which is shown in FIG. 3) and the back-end device 40. When the job output section 14 receives the job output instruction, the job output section 14 outputs the pages of the print data 100 to the command distribution section 16 in the order of the pages in the print data 100 for the job (S1).

When a job management section 23 of the interpretation device 20 receives the process start instruction for the job, the job management section 23 generates a queue including the job ID corresponding to the instruction, and manages execution of the job using the queue. The job management section 23 instructs a command reception section 21 to start a process for requesting the front-end device 10 for a page for the job. When the command reception section 21 receives the instruction, the command reception section 21 monitors the number of unprocessed pages retained on hand by the interpretation device 20 (that is, the number of pages that have been allotted to the interpretation device 20 but that have not been processed yet by the interpretation device 20), the current processing load on an RIP processing section 25, and so forth, and determines whether or not to accept allotment of a new page on the basis of the monitoring results. The RIP processing section 25 is a unit that interprets PDL data to generate intermediate data. In the determination, for example, it is determined from the number of unprocessed pages retained on hand and the current processing speed of the RIP processing section 25 whether or not it is possible to completely process a newly allotted page within a predetermined time. If it is determined to be possible, it is determined to receive allotment of a new page (S2).

When a page allotment request arrives from the interpretation device 20 in response to such a determination, the command distribution section 16 distributes a command for an interpretation process for the first unallotted page in the print data 100 to the interpretation device 20 (S2). In the case where the print data 100 are page-dependent PDL data, the print data 100 have been transmitted to the interpretation devices 20 before the first page is allotted. In the case of page-independent PDL data, for example, PDL data for the page to be allotted are sent to the interpretation device 20 at this time. In addition, the command distribution section 16 sends the reference information 200 to the back-end device 40 (S2).

The command reception section 21 of the interpretation device 20 transfers an instruction to process the page received from the front-end device 10 to the job management section 23 (S3). The instruction includes information similar to the reference information 200 (a set of the job ID and the page number). The job management section 23 adds the received information to the end of the queue corresponding to the job ID.

The job management section 23 of the interpretation device 20 instructs the RIP processing section 25 to interpret the page in accordance with the transferred page processing instruction (S4). The job management section 23 instructs the RIP processing section 25 to process the first page in the queue on a first-in first-out basis each time the RIP processing section 25 finishes processing the intermediate data for a designated page.

The page interpretation and intermediate data generation processes performed by the RIP processing section 25 and the page request control performed by the command reception section 21 are executed concurrently. That is, the RIP processing section 25 sequentially processes the pages designated by the job management section 23, and concurrently the command reception section 21 determines from the processing load on the RIP processing section 25 or the like whether or not to request a next page to make a request in accordance with the determination results.

When the RIP processing section 25 finishes generating intermediate data for the pages, the job management section 23 delivers the intermediate data and the reference information 200 on the pages to a spool management section 27, and instructs the spool management section 27 to register such data and information in the spooling device 30 (S5). In response to the instruction, the spool management section 27 correlates the intermediate data and the reference information 200, and stores the correlated data and information in the spooling device 30. When the data and information are stored in the spooling device 30, the spool management section 27 requests a data distribution section 29 to send the reference information 200 on the pages to the back-end device 40 (S6). In response to the request, the data distribution section 29 sends a spool completion notification including the reference information 200 to the back-end device 40 (S7).

When a process start instruction for the job is received from the front-end device 10, a job management section 43 of the back-end device 40 generates management information for the job correlated with the job ID included in the instruction, and thereafter waits for a notification from the front-end device 10 and the interpretation devices 20.

When the reference information 200 for the pages arrives from the front-end device 10 (S2), a command reception section 41 receives the reference information 200, and transfers the reference information 200 to the job management section 43. The job management section 43 incorporates the reference information 200 into the job management information.

When the spool completion notification for the pages (including the reference information 200) arrives from the interpretation device 20 (S7), the command reception section 41 receives the notification, and transfers the notification to the job management section 43 (S8). The job management section 43 checks the job ID and the page number in the reference information 200 included in the notification, and sets a flag, indicating that the page corresponding to the page number included in the job management information corresponding to the job ID has been completely spooled, in the reference information 200.

When an output request including output order information arrives from the front-end device 10 (S9), the command reception section 41 receives the request, and transfers the request to the job management section 43 (S10). After receiving the output request, the job management section 43 starts execution of the job corresponding to the job ID included in the request.

After starting execution of the job, the job management section 43 requests a rasterization processing section 45 to rasterize the pages, sequentially from the first page, in accordance with the order indicated by the output order information (S11). In this event, the job management section 43 monitors the processing status of the rasterization processing section 45, determines on the basis of the monitoring results whether or not it is possible for the rasterization processing section 45 to rasterize a new page, and requests the rasterization processing section 45 to rasterize a new page if it is determined to be possible.

In response to a request for rasterization from the job management section 43, the rasterization processing section 45 requests a data acquisition section 47 to transfer the intermediate data for that page (S12).

The data acquisition section 47 specifies which spooling device 30 stores the intermediate data for the requested page from the reference information 200 for the page in the job management information retained by the job management section 43, and requests the spooling device 30 for the intermediate data for that page (S13). In the example, the interpretation devices 20 and the spooling devices 30 are in a one-to-one correspondence, and the spool management section 27 of the interpretation device 20 manages the spooling device 30. Thus, the request for the intermediate data for a page is sent to the interpretation device 20. When the intermediate data for a page are requested, the data distribution section 29 of the interpretation device 20 requests the spool management section 27 for the intermediate data for that page. The spool management section 27 retrieves the intermediate data for that page from the spooling device 30, and delivers the data to the data distribution section 29. The data distribution section 29 returns the intermediate data to the data acquisition section 47 of the back-end device 40 which made the request.

The data acquisition section 47 delivers the acquired intermediate data to the rasterization processing section 45. The rasterization processing section 45 rasterizes the intermediate data to generate raster image data for the page, and delivers the generated raster image data to the job management section 43 (S14). The job management section 43 delivers the received raster image data to an engine controller 49 (S15). The engine controller 49 transmits the raster image data to the printer 50, and causes the printer 50 to execute printing.

An example of operation of the system according to the exemplary embodiment has been described above. Next, another operation mode of the system according to the exemplary embodiment will be described with reference to FIG. 4.

In the operation mode shown in FIG. 1, the reference information for the pages is sent from the front-end device 10 or the spooling devices 30 to the back-end device 40. In the operation mode shown in FIG. 4, on the contrary, no reference information is provided from the front-end device 10 or the spooling devices 30 to the back-end device 40. Such a situation may be caused, for example, in the case where a job is executed once with a certain back-end device 40 and a certain printer 50 designated as the output destination, and thereafter the spooled data (intermediate data) for the job stored in the group of spooling devices 30 are output to a different output destination to be printed again. That is, in such a case, the back-end device 40 and the printer 50 designated as the new output destination have no reference information for the pages of the job at the time point. The same situation may also be caused in the case where a user issues a command to execute only interpretation and spooling of the print data 100 without designating an output destination. For example, a huge amount of print data 100 may be automatically interpreted and spooled during night time without human attendance, and the spooled job may be output to be printed during business hours the next day while the user may supervise the printing system. Also in this case, the back-end device 40 has no reference information for the pages of the job at the time point when an output request is received.

Steps (1) to (4) in the example of FIG. 4 are the same as the steps with identical numbers shown in FIG. 1 except that no reference information is sent from the front-end device 10 to the back-end device 40 as the current output destination. By repeating steps (1) to (4), the intermediate data for all the pages of the print data 100 are accumulated in a distributed manner in the spooling devices 30.

(5) When the user designates the job ID of a job to be output and the back-end device 40 and the printer 50 as the output destination and inputs imposition designation information to the front-end device 10 to issue a command to print, the front-end device 10 sends an output request including the job ID and output order information matching the imposition designation information to the designated back-end device 40.

(6) When the back-end device 40 receives the output request, the back-end device 40 requests all the spooling devices 30 included in the system to provide reference information 200 for the pages corresponding to the job ID.

(7) In response to the request, the spooling device 30 (in the case where the spooling device 30 is managed by the interpretation device 20, the interpretation device 20) transmits to the back-end device 40 the reference information 20 for the page corresponding to the job ID stored in the spooling device 30.

(8) When the back-end device 40 receives the reference information 200, the back-end device 40 references the reference information 200, and acquires the intermediate data 102 for the pages, sequentially from the intermediate data 102 for the first page in the output order indicated by the output order information, from the spooling devices 30 storing the intermediate data 102.

(9) The back-end device 40 rasterizes the acquired pages in the order of acquisition.

(10) The back-end device 40 imposes the raster image data obtained through the rasterization, and supplies the resulting data to the printer 50. The printer 50 prints the imposed raster image data onto paper.

Thus, if the back-end device 40 has received no reference information 200, the back-end device 40 acquires the reference information 200 from the spooling devices 30 to grasp which spooling device 30 stores the intermediate data for the pages of a job for which an output request is received from the front-end device 10.

There is a certain degree of freedom in hardware implementation of the printing system shown in FIGS. 1, 3, and 4.

The four elements of the printing system according to the exemplary embodiment, namely the front-end device 10, the interpretation devices 20, the spooling devices 30, and the back-end device 40, may each be implemented by causing a computer to execute a program representing the function of each element. In this case, a physically single computer may be provided with the function of one of the four elements, or a physically single computer may be provided with the functions of plural elements. In a system configuration aiming for high-speed operation, for example, the front-end device 10, the interpretation devices 20, and the back-end device 40 may be implemented on separate computers. With the aim of reducing the hardware cost, it is also conceivable to implement the front-end device 10, the interpretation devices 20, the spooling devices 30, and the back-end device 40 on a physically single computer.

The computer has a circuit configuration in which, for example, a microcomputer such as a CPU, memories (primary storage devices) such as a random-access memory (RAM) and a read-only memory (ROM), secondary storage devices (such as a hard disk drive, a solid state drive, and a flash memory), various input/output (I/O) interfaces, network interfaces that control connection with a network such as a local area network, etc. are connected via a bus, for example. A disk drive that reads data from and/or writes data into a portable disc recording medium such as a CD and a DVD, a memory reader/writer that reads data from and/or writes data into a portable non-volatile recording medium according to various standards such as a flash memory, etc. may be connected to the bus. A program that describes the content of processes performed by the functional modules described above is stored in the secondary storage device to be installed on the computer by way of a recording medium such as a CD and a DVD or by way of a communication unit such as a network. The program stored in the secondary storage device is read by the RAM and executed by the microprocessor such as a CPU to implement the group of functional modules described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
a plurality of interpretation devices;
a plurality of spooling devices;
an allotment device that allots pages of print data written in a page description language to the plurality of interpretation devices in a distributed manner in a predetermined order without regard to a print output order of the pages corresponding to an imposition designation, the plurality of interpretation devices interpreting the pages of the print data allotted by the allotment device to generate interpretation result data, and each causing a spooling device of the plurality of spooling devices corresponding to that interpretation device to store the generated interpretation result data; and
a print controller that acquires reference information indicating which of the plurality of spooling devices stores the interpretation result data corresponding to each of the pages of the print data and output order information indicating the print output order of the pages corresponding to the imposition designation, that acquires the interpretation result data for each page from the spooling device storing the interpretation result data for that page designated by the reference information in the print output order indicated by the output order information, and that imposes page image data based on the acquired interpretation result data for the pages in accordance with the imposition designation to supply the resulting data to a printer to be printed.

2. The printing system according to claim 1,
wherein the plurality of spooling devices each store the reference information for a page corresponding to the interpretation result data stored in that spooling device, and
when the print controller receives a request to output the print data including the output order information, and in the case where the print controller has not obtained the reference information corresponding to such print data, the print controller requests the plurality of spooling devices for the reference information corresponding to the print data to acquire such reference information.

3. The printing system according to claim 1,
wherein when the allotment device receives a request to allot a new page from an interpretation device of the plurality of interpretation devices, the allotment device allots a page of the print data that has not been allotted to any of the interpretation devices yet to the interpretation device that issued the request, and
in the case where a new page is allotted, the plurality of interpretation devices each determine on the basis of a processing load on that interpretation device whether or not an interpretation process for that page is executable with predetermined time conditions met, and each request the allotment device for allotment of a new page in the case where it is determined that the interpretation process is executable with the time conditions met.

* * * * *